Figures 1, 2:
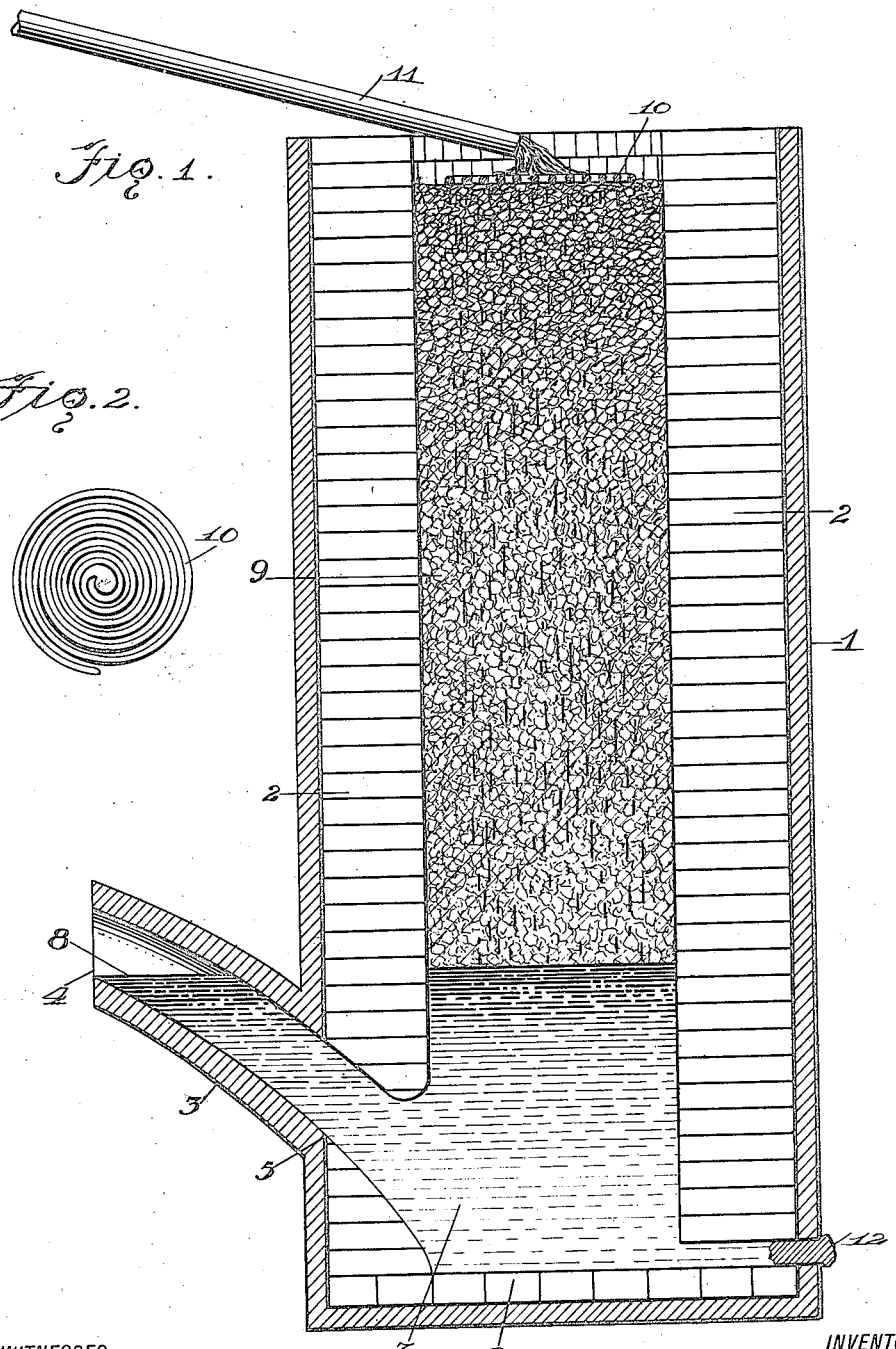

Oct. 23, 1923. 1,472,006
L. JONES
METHOD AND APPARATUS FOR THE REDUCTION OF IMPURITIES
CONTAMINATING MOLTEN METALS
Filed Oct. 3, 1922

WITNESSES
M. W. Fowler
Harry E. Deedel

INVENTOR
Llewellyn Jones.
BY
Munn & Co.
ATTORNEYS

Patented Oct. 23, 1923.

1,472,006

UNITED STATES PATENT OFFICE.

LLEWELLYN JONES, OF MUNCIE, INDIANA.

METHOD AND APPARATUS FOR THE REDUCTION OF IMPURITIES CONTAMINATING MOLTEN METALS.

Application filed October 3, 1922. Serial No. 592,041.

*To all whom it may concern:*

Be it known that I, LLEWELLYN JONES, a citizen of the United States, and a resident of Muncie, in the county of Delaware and State of Indiana, have invented certain new and useful Improvements in Methods and Apparatus for the Reduction of Impurities Contaminating Molten Metals, of which the following is a specification.

This invention relates to a method and apparatus for the reduction of impurities in molten metals. Dependence is placed upon the Bessemer or converter process for the elimination of graphite carbon from the molten metal while in the open hearth phosphorus and sulphur are removed by fluxing.

It is an object of my invention to provide a process for the elimination of all these impurities from the molten iron which leaves the so-called blast furnaces or cupolas by filtering the molten metal through molten slag and cinders.

Another object of the invention is the provision of a process for the reduction of impurities and foreign matter in liquid iron or steel by filtering the metallic liquid in a vessel.

It is a further object of my invention to provide an apparatus in the form of an open retort partially filled with a filtering material, the vessel being provided with an outlet disposed above the bottom of the vessel whereby some of the liquid metal will be retained within the vessel for floating the filtering material.

Other objects and advantages of the invention will be apparent during the course of the following description.

The invention is illustrated by way of example in the accompanying drawings, in which, Figure 1 is a vertical section of a vessel for carrying out my improved process for the reduction of phosphorus and sulphur in molten steel or iron.

Figure 2 is a plan view of a ring for breaking the fall of the molten metal on the entrapped slag.

Referring to the drawings, 1 designates the outer metal shell of a vessel which is interiorly lined with a fire brick 2. The vessel is open at its top and the bottom is provided with a discharging spout 3, the outlet 4 of which is located above the plane of the opening 5, which connects the discharge spout 3 with the interior of the vessel. The outlet 4 is located sufficiently above the bottom 6 of the vessel that a certain amount of the molten metal 7 will be entrapped in the bottom of the vessel. It will be seen from Figure 1 that the level of the liquid designated at 8, will be in a plane passing through the lower end of the outlet 4 whereby a certain amount of the molten metal will rise within the vessel and above the opening 5 between the spout 3 and the interior of the vessel.

The vessel is filled with molten slag and cinders shown at 9, which are prepared in a separate furnace. The slag and cinders are adapted to float on the top of the molten metal 7 when sufficient liquid metal has been poured into the vessel to provide the level 8 for the liquid.

The slag adjacent the top of the vessel 1 supports a filtering member or disc 10 made of a material which will stand the intense heat of the molten metal. The member 10 is shown in the form of a spiral, but the same may be a perforated disc, and is adapted to break the fall of the incoming stream of metal.

An opening is formed at the lower end of the retort through the fire brick 2 in the outer casing 1 to provide a passage for removing the molten metal 7 from the vessel when desired. A plug 12 composed of some fire-resistant material closes said passage to prevent the loss of metal during the operation of filtering.

Some form of channel, as shown at 11, is provided for admitting the molten metal directly upon the ring or disc 10 which is supported upon the floating slag 9. The channel 11 is formed of some fire-resistant material which will not be affected by the molten metal carried through said channel from a furnace to the interior of the vessel.

In carrying out my improved process, the vessel 1 is located sufficiently close to the blast furnace whereby the molten metal from said furnace may be immediately poured into the top of the vessel 1. The discharge end of the vessel is plugged by suitable material when the metal is poured into the vessel. The molten metal filters downwardly through the molten slag and cinders 9 falling to the bottom of the vessel until the molten metal has reached the level 8 when said metal will begin to run out through the spout 3 and the outlet port 4. The molten slag and cinders will then float upon the top of the molten metal 7. A continued pouring of the molten metal through the slag and cinders which float upon the molten metal 7 will filter the incoming stream of molten metal and force the entrapped metal 7 out through the spout 3. Since the metal upon leaving the furnace has a temperature of 3000° F. and the slag is in a molten state, the slag will be maintained in its molten state by the high temperature of the constant stream of molten metal.

The filtering of the metal by the slag and cinders eliminates phosphorus, sulphur, gases and volatilized minerals and other foreign matter found in the molten metal, due to the fact that molten slag has a greater affinity for these elements. When desired or necessary a decarbonizing element is introduced with the slag for eliminating carbon. The slag employed may be basic, acid or neutral, the kind of slag used depending upon the conditions met with at the field of operation. The slag, whether basic, acid or neutral, functions as a scavenger, deoxidizer, and as a gas absorbent.

When necessary a battery of the vessels shown in Figure 1 may be so connected that the molten metal passing through the first vessel will be discharged through the spout 3 of the first vessel and into a second vessel. Other vessels may be connected with the second vessel to provide a continuous path whereby the molten metal may be filtered by the slag or cinders entrapped in the various vessels and whereby a thorough elimination of impurities from the molten metal will be had. The succeeding vessels connected with the first vessel are similarly constructed and are provided with a similar quantity of slag or cinders which will be floated by the liquid entrapped in the lower portion of the vessels.

It may be required in some instances to divide the volume of molten metal leaving a furnace into a number of streams with each stream directed to a separate filtering vessel since the volume of a furnace may be too great to handle as a single stream.

During the melting down process of metal, volatilized mineral gases and other elements which contaminate the metal and which are entrapped in the molten metal, are taken up by re-agents in the molten slag or cinders which float upon the molten metal. It will be noted that the filtering process functions continuously as the metal percolates or passes through the slag and whereby the metal is washed by the slag and eliminated of impurities by reason of the strong affinity of different slags for gases. These impurities which contaminate the molten metal, if not eliminated will injure subsequent castings.

What I claim is:

1. In the production of metals for foundry uses, the process which consists in passing molten metal direct from a blast furnace or cupola through a filtering material in an open vessel to remove the greater part of sulphur and phosphorus.

2. In the production of metals for foundry uses, the process which consists in passing molten metal direct from a blast furnace or cupola through a filtering material in an open vessel to remove the greater part of sulphur and phosphorus, and collecting some of the molten metal at the bottom of the vessel.

3. In the production of metals for foundry uses, the process which consists in passing molten metal direct from a blast furnace or cupola through a filtering material in an open vessel to remove the greater part of sulphur and phosphorus, collecting some of the molten metal at the bottom of the vessel, and floating the filtering material on the collected molten metal.

4. In the production of metals for foundry uses, a process which consists in passing molten metal direct from a blast furnace or cupola in fine particles through a filtering material in an open vessel to remove the greater part of sulphur and phosphorus.

5. An apparatus for the elimination of impurities from molten steel or iron which has been run directly from a blast furnace or cupola comprising an open vessel formed of a metal shell, a fire brick lining within the shell, said lining and shell being provided with an outlet at a point elevated above the bottom of the vessel, a column of filtering material extending from a point in the same plane with the outlet port to substantially the top of the vessel.

6. An apparatus for the elimination of impurities from molten steel or iron which has been run directly from a blast furnace or cupola comprising an open vessel formed of a metal shell, a fire brick lining within the shell, said lining and shell being provided with an outlet at a point elevated above the bottom of the vessel, a column of filtering material extending from a point in the same plane with the outlet port to substantially the top of the vessel, a spiral means located on the top of the column of filtering material for breaking molten metal into fine particles when poured into the top of said vessel.

7. A process for refining of liquid metals from furnaces, which consists in passing the molten metal through a filtering material such as slag and cinders in a vessel, trapping some of the molten metal in the bottom of the vessel, withdrawing the molten metal at a point in the vessel which is at the level of the entrapped molten metal, and floating the slag and cinders on the entrapped molten metal while passing a continuous stream of molten metal through the floating cinders and slag.

8. A process for refining of liquid metals from furnaces, which consists in passing a continuous stream of molten metal through a filtering material entrapped in a series of vessels.

LLEWELLYN JONES.